(12) United States Patent
Sethi et al.

(10) Patent No.: US 11,397,974 B2
(45) Date of Patent: Jul. 26, 2022

(54) METHOD AND SYSTEM FOR ASSESSING QUALITY OF COMMODITIES

(71) Applicant: NEBULAA INNOVATIONS PRIVATE LIMITED, Rajasthan (IN)

(72) Inventors: Tanmay Sethi, Rajasthan (IN); Mohit Dadhich, Rajasthan (IN); Yogesh Kumar Gupta, Gangapur (IN); Tapish Rathore, Rajasthan (IN)

(73) Assignee: NEBULAA INNOVATIONS PRIVATE LIMITED, Rajasthank (IN)

( * ) Notice: Subject to any disclaimer, the term of this patent is extended or adjusted under 35 U.S.C. 154(b) by 497 days.

(21) Appl. No.: 16/500,902

(22) PCT Filed: Apr. 6, 2018

(86) PCT No.: PCT/IN2018/050199
§ 371 (c)(1),
(2) Date: Oct. 4, 2019

(87) PCT Pub. No.: WO2018/185786
PCT Pub. Date: Oct. 11, 2018

(65) Prior Publication Data
US 2020/0134682 A1    Apr. 30, 2020

(30) Foreign Application Priority Data

Apr. 6, 2017  (IN) .............................. 201711012372

(51) Int. Cl.
*G06T 7/00*      (2017.01)
*G06Q 30/06*    (2012.01)
(Continued)

(52) U.S. Cl.
CPC ......... *G06Q 30/0601* (2013.01); *G06F 16/51* (2019.01); *G06K 9/627* (2013.01);
(Continued)

(58) Field of Classification Search
CPC ........... G06Q 30/0601; G06Q 30/0283; G06Q 30/0625; G06F 16/51; G06K 9/6256;
(Continued)

(56) References Cited

U.S. PATENT DOCUMENTS 6,587,575 B1 *  7/2003  Windham ............... A22B 5/007
                                                                    382/110
8,284,248 B2 * 10/2012  Bourg, Jr. ............. G06T 7/0004
                                                                    382/110

(Continued)

OTHER PUBLICATIONS

International Search Report dated Jul. 24, 2018 from corresponding International Patent Application No. PCT/IN2018/050199, 4 pages.

(Continued)

*Primary Examiner* — Ping Y Hsieh
(74) *Attorney, Agent, or Firm* — Ohlandt, Greeley, Ruggiero and Perle, LLP

(57) ABSTRACT

The present disclosure relates to method and system for assessing quality of commodities. An image of bulk commodity is captured and segmented into one or more segmented images for classification into one of predefined categories of commodities. The method and system classify the commodities based on generalized features created from training images. One or more features in the training images are determined and grouped to obtain the generalized features. A feature score and corresponding weightage score of the generalized feature is then determined to estimate a predetermined regression score. Based on the generalized features and predetermined regression score, a likelihood score of the segmented image is determined that enables the classification of the input image to one of the predefined categories of commodities. Thus, the present disclosure enables quality assessment of commodity by categorizing each commodity of input image into corresponding category with improved accuracy and reduced classification error.

16 Claims, 6 Drawing Sheets

(51) Int. Cl.
*G06T 7/136* (2017.01)
*G06T 7/194* (2017.01)
*G06F 16/51* (2019.01)
*G06N 20/00* (2019.01)
*G06K 9/62* (2022.01)

(52) U.S. Cl.
CPC .......... *G06K 9/6256* (2013.01); *G06N 20/00* (2019.01); *G06T 7/0004* (2013.01); *G06T 7/136* (2017.01); *G06T 7/194* (2017.01); *G06T 2207/20081* (2013.01); *G06T 2207/30128* (2013.01)

(58) Field of Classification Search
CPC ...... G06K 9/627; G06N 20/00; G06T 7/0004; G06T 7/136; G06T 7/194; G06T 2207/20081; G06T 2207/30128; G06T 7/11; G06T 7/0002
See application file for complete search history.

(56) References Cited

U.S. PATENT DOCUMENTS

| | | | | |
|---|---|---|---|---|
| 8,565,503 | B2* | 10/2013 | Eichhorn | G06T 7/0004 382/128 |
| 9,014,434 | B2* | 4/2015 | Bajema | G06T 7/0004 382/110 |
| 2004/0197012 | A1* | 10/2004 | Bourg, Jr. | G06T 7/0004 382/110 |
| 2010/0147561 | A1* | 6/2010 | Uchiyama | H05K 3/303 29/850 |
| 2011/0050880 | A1* | 3/2011 | Bourg, Jr. | G06T 7/90 382/110 |
| 2019/0318407 | A1* | 10/2019 | Giridhari | G06Q 30/0627 |

OTHER PUBLICATIONS

Written Opinion dated Jul. 24, 2018 from corresponding International Patent Application No. PCT/IN2018/050199, 5 pages.

* cited by examiner

METHOD AND SYSTEM FOR ASSESSING QUALITY OF COMMODITIES

TECHNICAL FIELD

The present invention is related, in general to the field of image analysis and more particularly, but not exclusively to a method and system for assessing quality of commodity.

BACKGROUND

Currently, there are no methods to assess quality of commodities and to provide quality-based pricing of the commodities. Also, there are no standards for customer to provide assurances that the product purchased meets customer needs. It is highly difficult to do quality analysis or assessment for these commodities manually because of highly cumbersome process of performing it. Too many equipment and tools are required to perform the task of quality assessment. Further, monitoring the quality of bulk commodities is often difficult and subject to error.

Conventional quality assessment methods include image processing of bulk commodity so as to classify the commodities to one of predefined categories and determining the quality based on the classification. These methods, however, require features used to classify the commodities, to be provided manually as input in order to classify into correct category. As these conventional methods use manually provided features to classify the commodities, there could be high probability of incorrect classification due to limited number of features provided manually. Also, it may not be possible to predict generalized features for each category of commodity. Therefore, there is a need for a method and system that automatically defines or generates features for each category and determine presence of multiple categories in bulk commodity to assess quality of commodities.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Embodiments of the present disclosure relates to a method of analyzing quality of commodities. The method comprises receiving an input image of commodities captured by at least one image sensor. The method segments the received input image to generate plurality of segmented images of the input image. For each segmented image, a feature score is determined for each of a plurality of generalized features identified based on random combination of pixels in the segmented image. The generalized features are generated during training of labelled commodity images. Further, a regression score is computed for each of plurality of segmented images based on the feature score and a predetermined weightage score corresponding to the plurality of generalized features. The predetermined weightage scores are determined dynamically during training of labeled images. Upon computing the regression score, a likelihood score is determined for each segmented image with respect to each of the one or more predefined categories of commodities. The likelihood score is determined by comparing the regression score with predetermined regression scores of each predefined category of commodities determined during training of labelled commodity images. Based on the likelihood score each segmented image is classified to one of the predefined categories of commodities to assess quality of the commodities.

Further, the present disclosure relates to a system for analyzing quality of commodities. The system comprises a processor and a memory communicatively coupled to the processor. The memory stores processor-executable instructions, which on execution, cause the processor to receive an input image of commodities captured by at least one image sensor coupled with the processor. The processor further segments the input image to generate a plurality of segmented images. The processor is configured to determine a feature score for each of a plurality of generalized features identified based on random combination of pixels in the segmented image. Further, the processor is configured to compute a regression score for each of plurality of segmented images based on the feature score and a predetermined weightage score corresponding to the plurality of generalized features. The plurality of generalized features and the predetermined weightage scores are determined during training of labeled images. Further, the processor determines a likelihood score for each segmented image with respect to each of the one or more predefined categories of commodities. The likelihood score is determined by comparing the regression score with predetermined regression scores of each predefined category of commodities determined during training of labelled commodity images. Based on the likelihood score the processor is configured to classify each segmented image to one of the predefined categories of commodities to assess quality of the commodities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
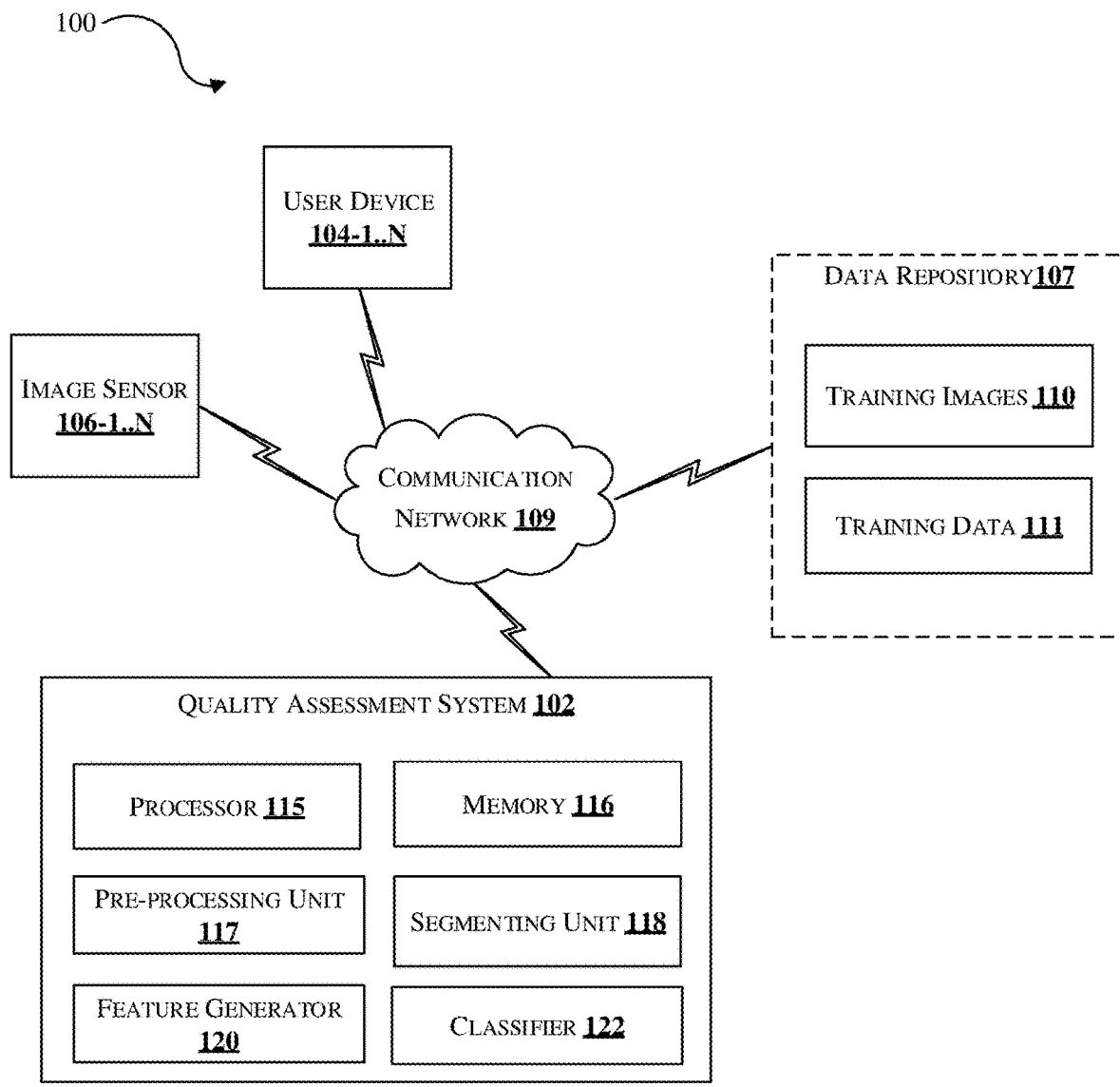
FIG. 1 illustrates an exemplary architecture of a system for quality assessment of commodity, in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method and system for assessing quality of commodities. In one embodiment, the method classifies commodities to one of pre-defined categories by image processing and training of labelled commodities. In one embodiment, the system automatically generates a plurality of generalized features from plurality of training images of commodities of one or more predefined categories by random combination of pixels of the training images. Further, the system determines predetermined weightage score for each generalized feature and regression score for each commodity of predefined categories based on the obtained predetermined weightage scores. In real time operation, the system receives an image of bulk commodities as input and generates one or more segmented images of the input image. For each segmented image, a feature score is determined for each of a plurality of generalized features generated during training of labelled commodity images. Further, the regression score is computed for each segmented image based on the feature score of generalized features and the predetermined weightage scores. A likelihood score with respect to each of predefined categories of commodities is determined for each segmented image by comparing the regression score with predetermined regression scores of the predefined categories of commodities. Furthermore, the likelihood score with highest value is identified and the segmented image is classified to belong to the category associated with the identified likelihood score. Based on the classification, the system generates a quality analysis report indicating the count of predefined categories of commodities. Thus, the disclosure enables quality assessment of commodities with reduced classification error occurring due to limitations in features by automatically generating features for various categories of commodities.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture of a system for enabling quality assessment of commodity, in accordance with some embodiments of the present disclosure.

As shown in FIG. 1, the exemplary system 100 comprises one or more components configured to perform quality assessment for commodities. In one embodiment, the exemplary system 100 comprises a quality assessment system 102 (hereinafter referred to as QAS 102), one or more user devices 104-1, 104-2, . . . 104-N (collectively referred to as user device 104), one or more image sensors 106-1, 106-2, . . . 106-N (collectively referred to as image sensor 106) and a data repository 107 connected via a communication network 109.

The communication network 109 may include, without limitation, a direct interconnection, LAN (local area network), WAN (wide area network), wireless network, point-to-point network, or another configuration. One of the most common types of network in current use is a TCP/IP (Transfer Control Protocol and Internet Protocol) network for communication between database client and database server. Other common Internet protocols used for such communication include HTTPS, FTP, AFS, and WAP and using secure communication protocols etc.

The user device 104 may be a mobile device or a computing device including the functionality for communicating over the network. For example, the mobile device can be a conventional web-enabled personal computer in the home, mobile computer (laptop, notebook or subnotebook), Smart Phone (iOS, Android), personal digital assistant, wireless electronic mail device, tablet computer or other device capable of communicating both ways over the Internet or other appropriate communications network. The user device 104 may comprise an integrated software application that enables real time interaction with the QAS 102 and the data repository 107. The user device 104 may also have a display screen to display a quality assessment report of the commodities based on the analysis by the QAS 102. In one embodiment, the user device 104 may comprise an integrated image sensor 106 for capturing image of the commodities. In another embodiment, the QAS 102 may employ the image sensor 106 externally coupled with the QAS 102 for capturing the image of the commodities. The image sensor 106 captures image of the commodities in any spectrum such as for example, infra-red spectrum, micro wave spectrum, visible spectrum, hyperspectral imaging and any other Electromagnetic spectrum.

The image sensor 106 may be a camera, industrial camera or any image acquisition device capable of capturing image of the commodities. In one embodiment, the image sensor 106 may be a CIS camera-based scanner and CCD camera scanner from dual sides of lower side and upper side of the image sensor 106. The image sensor 106 may capture two images from dual sides. The image sensor 106 may generate a single image by overlapping the two images and transmit to the QAS 102 for further processing. In another embodiment, the image sensor 106 may also store the captured image in the data repository 107 for future references.

The data repository 107 stores a plurality of training images 110, provided by a user via the user device 104, for each of predefined categories of commodity. In one example, commodity may be grain, and the training images 110 may be images of grain labelled with one or more predefined categories. For example, the predefined categories of grain include broken grains, semi-damaged grains, damaged grains, weevilled grains, shriveled grains, vertical broken, organic and inorganic impurities etc. The QAS 102 receives the plurality of training images 110 (interchangeably referred as labelled commodity images) for commodity grain via the user device 104 along with corresponding labels indicative of respective predefined categories. The QAS 102 processes the training images 110 to identify a plurality of generalized features for each category and generate a corresponding regression score (also referred to as predetermined regression score) based on plurality of features thus identified. The data repository 107 stores plurality of generalized features, a predetermined weightage scores, the predetermined regression score for each category of commodities as training data 111. The plurality of generalized features for example, may define the characteristics or aspects associated with each training image of the pre-defined categories of commodity. The predetermined weightage score for each feature is the significance value of the corresponding feature in the training images 110. In one embodiment, the data repository 107 may be integrated within the QAS 102. In another embodiment, the data repository 107 may be configured as standalone device independent of the QAS 102.

In operation, the QAS 102 is configured to perform quality assessment of the commodity by processing image of the commodities captured by the image sensor 106. In one example, the QAS 102 may be configured as a standalone system. In another example, the QAS 102 may be configured in cloud environment. In yet another example, the QAS 102 may include a desktop personal computer, workstation, laptop, PDA, cell phone, or any WAP-enabled device or any other computing device capable of interfacing directly or indirectly to the Internet or other network connection. The QAS 102 typically includes one or more user interface devices, such as a keyboard, a mouse, touch screen, pen or the like, for interacting with the GUI provided on a display. The QAS 102 also includes a graphical user interface (GUI) provided therein for interacting with the data repository 107 to access the training images 110 and the training data 111.

The QAS 102 comprises at least a processor 115 and a memory 116 coupled with the processor 115. The QAS 102 further comprises a pre-processing unit 107, a segmenting unit 118, a feature generator 120 and a classifier 122. The pre-processing unit 107 is configured to generate a plurality of segmented images from the input image captured by the image sensor 106. The feature generator 120 is configured to create or define plurality of generalized features for each predefined category of commodity by training the labelled commodity images and to determine predetermined weightage score corresponding to plurality of generalized features thus defined. Further, the feature generator 120 determines a feature score for the plurality of generalized features identified in each of the plurality of segmented images. The feature generator 120 is further configured to determine regression score for each of the plurality of segmented images based on the determined feature score and the corresponding predetermined weightage score for each feature. The classifier 122 determines a likelihood score for each segmented image with respect to each of one of more predefined categories of commodities by comparing the regression score with predetermined regression scores of each predefined category of commodities. The classifier 122 then classifies or categorizes each of the plurality of segmented images to one of the predefined categories based on the likelihood score of the plurality of segmented images for further assessing quality of the commodities.

Figure 2:
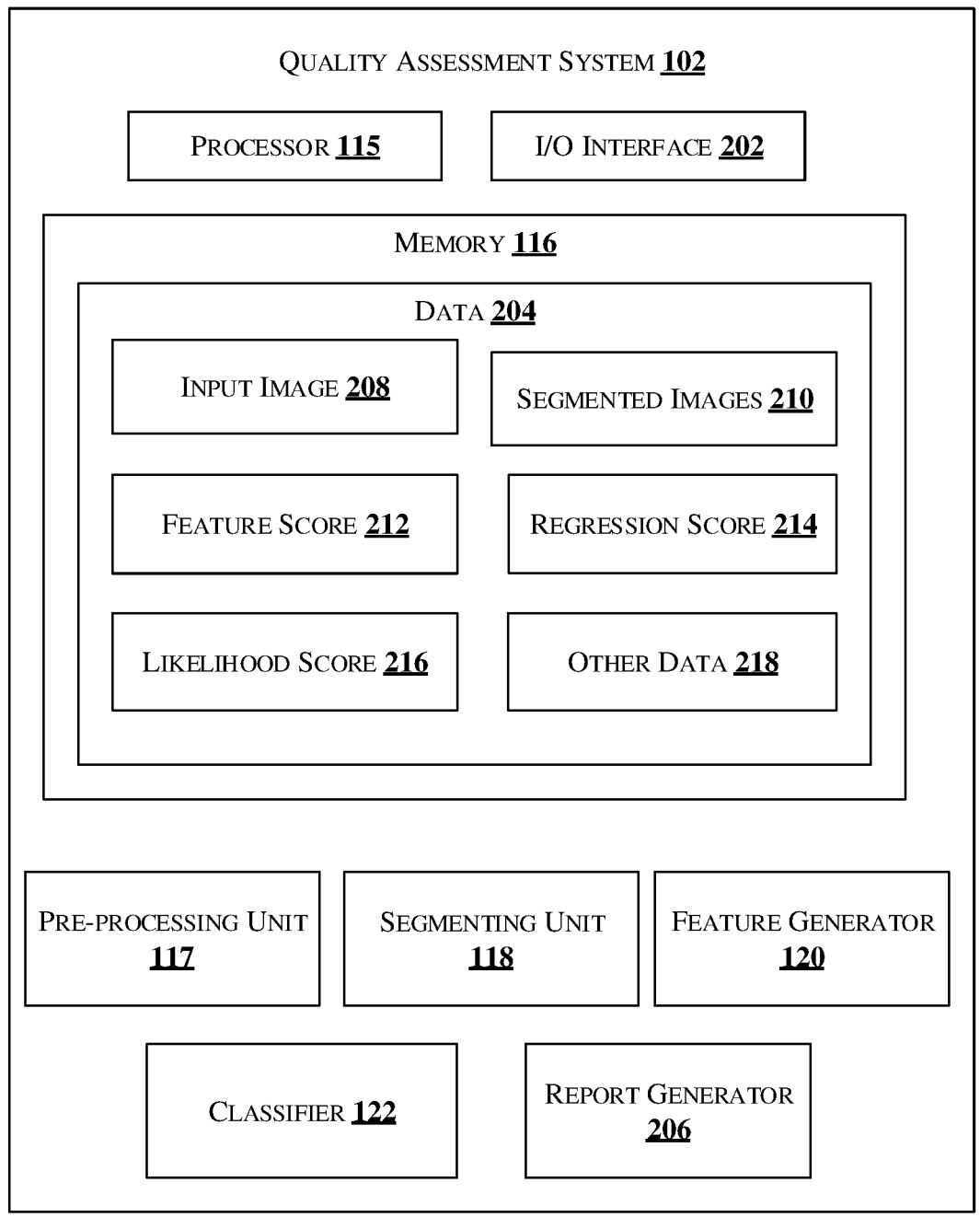
FIG. 2 illustrates a detailed block diagram of quality assessment system of FIG. 1 in accordance with an embodiment of the present disclosure.

In an embodiment, the QAS 102 may be a typical QAS as illustrated in FIG. 2. The QAS 102 comprises the processor 115, the memory 116, and an I/O interface 202. The QAS 102 further includes data 204 and one or more components including the preprocessing unit 107, the segmenting unit 118, the feature generator 120, the classifier 122 and a report generator 206. In one implementation, the data 204 may be stored within the memory 116. In one example, the data 204 may include input image 208, segmented images 210, feature score 212, regression score 214, likelihood score 216 and other data 218. In some embodiments, the data 204 may be stored within the memory 116 in the form of various data structures. Additionally, the data 204 may be organized using data models, such as relational or hierarchical data models. The other data 218 may store textural value, geometrical shape of corner points of grain and data, including temporary data and temporary files, generated by the components for performing the various functions of the QAS 102.

During training of the labelled commodity images i.e. training images 110, the training data 111 is determined. In one embodiment, the training data 111 comprises, for each predefined category of commodity, a plurality of generalized features, predetermined weightage scores corresponding to plurality of generalized features, and predetermined regression scores. The feature generator 120 is configured to perform training of the labelled commodity images and determine the training data 111. In one embodiment, the feature generator 120 receives the training images 110 as input from the user via the user device 104. In another embodiment, the plurality of training images 110 may be retrieved from the data repository 107. The training images 110 are images of commodity of one or more predefined categories. The feature generator 120 derives a plurality of features from the training images 110 by randomly combining pixels of the training images 110. The feature generator 120 randomly combines pixels and determines feature score for each of the plurality of features based on intensity value of randomly combined pixels. The intensity values of randomly combined pixels are determined as the feature score for the plurality of features.

Further, the feature generator 120 is configured to group the plurality of features having similar feature score to obtain one or more generalized features (hereinafter referred to as generalized features). The feature generator 120 further determines the feature score of the generalized features based on the presence or absence of the generalized features with respect to the training images 110. The grouping of plurality of features is repeatedly performed till the feature scores for the generalized features are distinctive enough to differentiate the training images 110 of predefined categories. The feature scores thus obtained for generalized features are referred as final feature scores. The feature generator 120 is also configured to determine the predetermined weightage score for the plurality of generalized features of the training images 110. The feature generator 120 initially assigns random value to weightage score for each feature of the training images 110 based on the presence of the feature in the training images 110. In an example, the feature generator 120 assigns a random weightage score to each feature in a first training image of the plurality of training images 110 and also assigns a non-zero value to the feature score based on the presence of feature in the first training image. In another example, the feature generator 120 assigns a zero value to the feature score if the feature is determined to be not present in the first training image. The feature generator 120 then computes regression score for the first training image using the random value of the weightage score and the feature score. The feature generator 120 computes regression scores for the remaining training images 110 using previously assigned random values and adjusts the weightage score of each feature in remaining plurality of training images 110 till the regression score matches with the value of computed regression score. The feature generator 120 thus obtains predetermined weightage scores for each of the generalized features for predefined categories of commodities. Upon obtaining the predetermined weightage scores, the feature generator 120 estimates final regression score for each of the predefined categories of commodities based on the feature scores of the generalized features and the predetermined weightage scores for plurality of generalized features of each of the predefined categories. The final regression scores thus obtained may be stored in the data repository 107 as predetermined regression scores along with associated label.

In operation, the QAS 102 receives the input image 208 captured by the image sensor 106. In one example, the input image 208 may be an image of any bulk commodity with presence of mixed categories of commodities. In one example, the commodity may be a grain and in particular, a wheat grain and the categories may include broken grains, shriveled grains, damaged grains, organic impurities etc. The input image 208 may comprise image of bulk wheat grains with a background. The preprocessing unit 107 receives and processes the input image 208 to generate the threshold image by removing background and other irregularities from the input image 208. In one embodiment, the input image 208 may be converted from RGB format into a predetermined three-dimensional (3D) color format, for example LAB color format. A LAB spectrum-based thresholding technique or any other known technique may be used for removing the background and other irregularities of the input image 208 to obtain the threshold image. Upon obtaining the threshold image, the segmenting unit 118 generates the plurality of segmented images 210 from the threshold image. In one example, the segmented images 210 is an image of individual commodity i.e. single grain image. To perform the segmentation, the segmenting unit 118 identifies one or more pixels corresponding to corner points of the commodities in the threshold image. In one example, the corner point in case of grains may include sharp end points of the grains and touching points of adjacent grains. The segmenting unit 118 determines textural value of pairs of adjacent pixels of the one or more identified pixels. The segmenting unit 118 also determines geometrical shape of corner points of each grain image. Based on the determined textural value and the geometrical shape, the threshold image is divided into plurality of segmented images 210 based on edges drawn by joining the identified pixels corresponding to one or more corner points.

The classifier 122 then classifies the plurality of segmented images 210 to one of the predetermined categories of commodities based on training of labelled commodity images.

For each segmented image, the feature generator 120 determines the generalized features and based on determination of presence of the generalized features in the segmented image 210, the feature generator determines the corresponding feature score 212. The feature generator 120 further computes a regression score 214 of each of the plurality of segmented images 210 based on the feature score 212 and a predetermined weightage score corresponding to the generalized features present in the segmented image 210. The classifier 122 determines a likelihood score 216 for each segmented image 210 with respect to each of the predefined categories of commodities by comparing the computed regression score 214 with the predetermined regression score of each of the one or more predefined categories of commodities. The classifier 122 further determines highest value of the likelihood score 216 of the segmented image 210 and classifies the segmented images 210 to one of the predefined categories associated with the highest value of the likelihood score 216. Thus, the system 100 enables quality assessment of bulk commodity by classification of each commodity i.e. each grain among a bulk of grains into one or more of damaged grains i.e. unusable grains and acceptable normal grains and generates a quality analysis report indicating the count of commodity or grain in each of the predefined categories for assessing the quality of commodities.

Figure 3A:
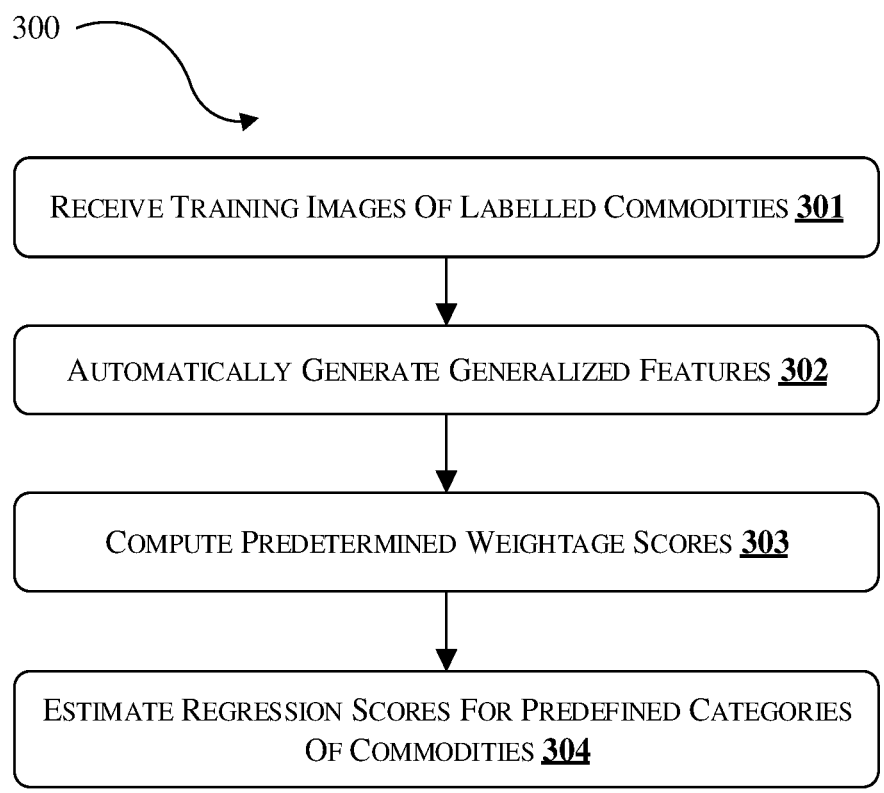
FIG. 3a shows a flowchart illustrating a method of training of labelled commodity images in in accordance with some embodiments of the present disclosure.

FIG. 3a shows a flowchart illustrating a method of training of labelled commodity images in accordance with some embodiments of the present disclosure.

As illustrated in FIG. 3a, the method 300 comprises one or more blocks implemented by the processor 115 for training labelled commodity images for predefined categories. The method 307 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 301, a plurality of training images 110 is received. In one embodiment, the feature generator 120 receives the plurality of training images 110 from the user via the user device 104. The training images 110 may be labelled commodity images of the one or more predefined categories of commodities.

At block 302, the generalized features of training images 110 are automatically generated. In one embodiment, the feature generator 120 derives plurality of features possibly extractable from the plurality of training images 110 by randomly combining pixels of the training images 110. The plurality of features may be a distinguishing property or characteristic or a trait of the training images 110. The feature generator 120 randomly combines plurality of pixels from the training image and determines feature score for the random combination of pixels as the intensity value of randomly combined pixels. Further, the feature generator 120 performs grouping of the derived features with similar feature score and obtains plurality of generalized features. In one embodiment, the grouping of plurality of features is repeatedly performed till the feature scores for the generalized features are sufficient enough to differentiate the labelled commodity images of predefined categories. The feature scores thus obtained for final set of plurality of generalized features are referred as final feature scores.

At block 303, predetermined weightage scores for generalized features of the training images 110 is determined In one embodiment, the feature generator 120 initially assigns random value to weightage score for each feature of a first training image of the plurality of training images 110. The feature generator 120 further determines the feature score for each feature of first training image as non-zero value based on the presence of feature in the first training image. The feature generator 120 then computes regression score for the first training image using the random value of the weightage score and the feature score. The feature generator 120 further assigns the previously assigned random weightage score to the features of second training image and determines the feature scores for the second training image and thereby computes the regression score for the second training image. Similarly, the feature generator 120 computes regression scores for the remaining training images 110 using previously assigned random values and adjusts the weightage score of each feature in remaining plurality of training images 110 till the regression score matches with the similar value of computed regression score. The feature generator 120 thus obtains predetermined weightage scores for each of the generalized features for predefined categories of commodities.

At block 304, predetermined regression score for each of the predefined categories of commodities is estimated. In one embodiment, the feature generator 120 estimates the regression scores for each of the predefined categories of commodities i.e. for each of weevilled, broken, shriveled, semi-damaged and other related categories in case of grain as commodity. The feature generator 120 computes the predetermined regression score for each category based on the final feature scores and the predetermined weightage scores for plurality of generalized features of each of the predefined categories. The final regression scores thus obtained, and associated label may be stored in the data repository 107 as predetermined regression scores.

Figure 3B:
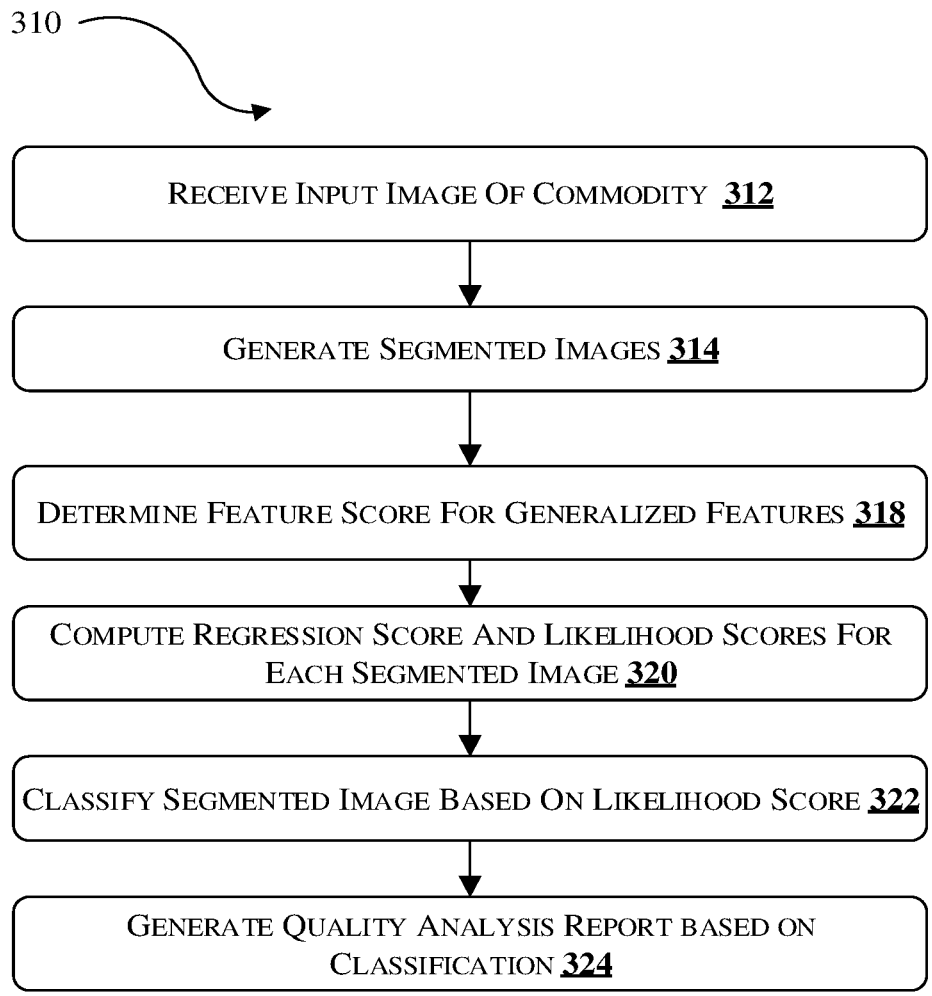
FIG. 3b shows a flowchart illustrating a method of assessment of quality of commodities in accordance with some embodiments of the present disclosure.

FIG. 3b shows a flowchart illustrating a method of assessment of quality of commodities in accordance with some embodiments of the present disclosure; and As illustrated in FIG. 3b, the method 310 comprises one or more blocks implemented by the processor 115 for quality assessment of a commodity. The method 310 may be described in the general context of computer executable instructions. Generally, computer executable instructions can include routines, programs, objects, components, data structures, procedures, modules, and functions, which perform particular functions or implement particular abstract data types.

The order in which the method 310 is described is not intended to be construed as a limitation, and any number of the described method blocks can be combined in any order to implement the method 310. Additionally, individual blocks may be deleted from the method 310 without departing from the spirit and scope of the subject matter described herein. Furthermore, the method 310 can be implemented in any suitable hardware, software, firmware, or combination thereof.

Figure 3C:
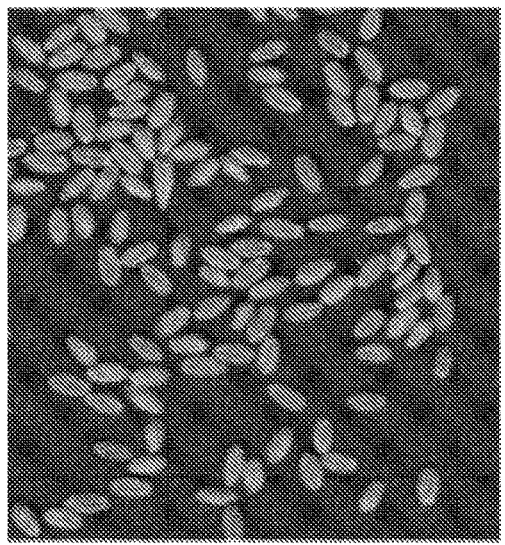
FIG. 3c shows exemplary sample commodity image with a color background comprising plurality of grains in accordance with some embodiments of the present disclosure.
Figure 3D:
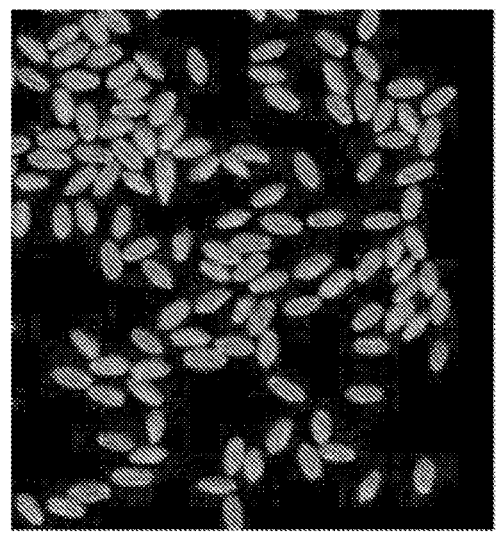
FIG. 3d shows exemplary threshold image obtained from the sample image of FIG. 3c in accordance with some embodiments of the present disclosure.

At block 312, the input image 208 of any commodity is received. In one embodiment, the QAS 102 receives the input image 208 of sample commodity captured by the image sensors 106. In one example, the sample may be bulk amount of any commodity such as wheat grain and the input image 208 comprises a random number of wheat grains placed on a tray with color background. For example, the commodities may comprise a plurality of grains placed on a colored tray as illustrated in FIG. 3c. The preprocessing unit 117 processes the captured input image 208 by removing background and related irregularities from the input image 208 to generate a threshold image. In an example, the input image of FIG. 3c is converted into the threshold image as shown in FIG. 3d.

Figure 3E:
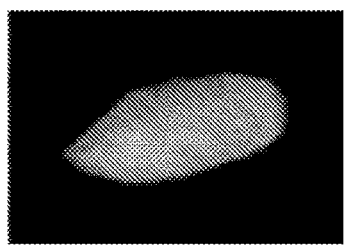
FIG. 3e, FIG. 3f and FIG. 3g shows exemplary sample of segmented images with multiple categories of commodities in accordance with some embodiments of the present disclosure.
Figure 3F:
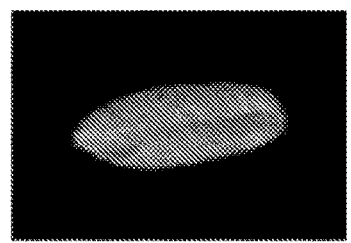
Figure 3G:
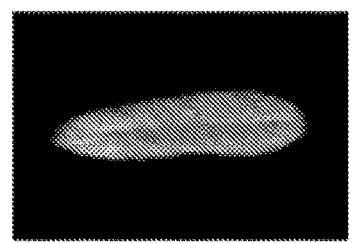

At block 314, the segmented images 210 are generated from the threshold image. In one embodiment, the segmenting unit 118 further segments the threshold image to generate plurality of segmented images 210 from the threshold image. The segmenting unit 118 identifies one or more pixels corresponding to corner points of the grains in the threshold image. The segmenting unit 118 determines textural value of pairs of adjacent pixels of the one or more identified pixels. The segmenting unit 118 also determines geometrical shape of corner points of each grain image. Based on the determined textural value and the geometrical shape, the segmenting unit 118 joins the identified pixels corresponding to corner points to draw an edge thereby segments adjoined grains to generate the plurality of segmented images 210. In one example, FIG. 3e illustrates plurality of segmented images 210 of predefined categories of grain commodity obtained by segmenting the threshold image shown in FIG. 3d. The segmented images 210 may include correct grains as illustrated in FIG. 3e, weevilled grains as illustrated in FIG. 3f, shriveled grains as illustrated in FIG. 3g and other related categories of grains. The segmented images 210 are now classified to determine the category of the grain and thereby the quality associated with the commodity sample.

At block 318, feature score 212 for each of a plurality of generalized features is determined. In one embodiment, the feature generator 120 determines the generalized features and based on the presence of generalized feature in the segmented image 210, the feature generator 120 determines the corresponding feature score 212 for each generalized feature. Based on the determined feature scores 212, the regression score 214 for each segmented image are computed at block 320.

At block 320, the regression score 214 and likelihood score 216 for segmented images 210 is computed. In one embodiment, the feature generator 120 computes the regression score 214 for each of the plurality of segmented images 210. The feature generator 120 retrieves the predetermined weightage score determined during training from the data repository 107 and computes the regression score 214 based on the determined feature score 212 for segmented image 210 and the predetermined weightage scores. Further, the classifier 122 determines the likelihood score 216 for each segmented image 210 with respect to each of the predefined categories of commodities. In one example, the likelihood score 216 may be determined as probability of the segmented image to each of the predefined categories of commodities. The classifier 122 compares the computed regression score 214 with predetermined regression scores of each of the one or more predefined categories of commodities and determines likelihood score 216 for each segmented image. Based on the likelihood score 216 of segmented images 210, classification of segmented images 210 is performed at block 322.

At block 322, the plurality of segmented images 210 is classified to one of predefined categories of commodities. In one embodiment, the classifier 122 identifies the highest value of the likelihood score 216 among the likelihood scores associated with the segmented image. Based on the predefined category associated with the highest value of the likelihood score 216, the classifier 122 assigns a label/class to each segmented image i.e. each grain.

At block 324, the quality of the commodity is assessed. In one embodiment, the report generator 206 generates a quality analysis report based on the classification of each of the plurality of segmented images 210. The quality analysis report may include the count of damaged grains i.e. unusable grains in the input image of commodity i.e. the count of predefined categories of commodities that help in assessing quality of commodity.

Thus, the QAS 102 enables assessing quality of commodity units in a quick and cost effective manner by classification of individual grains or units of commodity.

Figure 4:
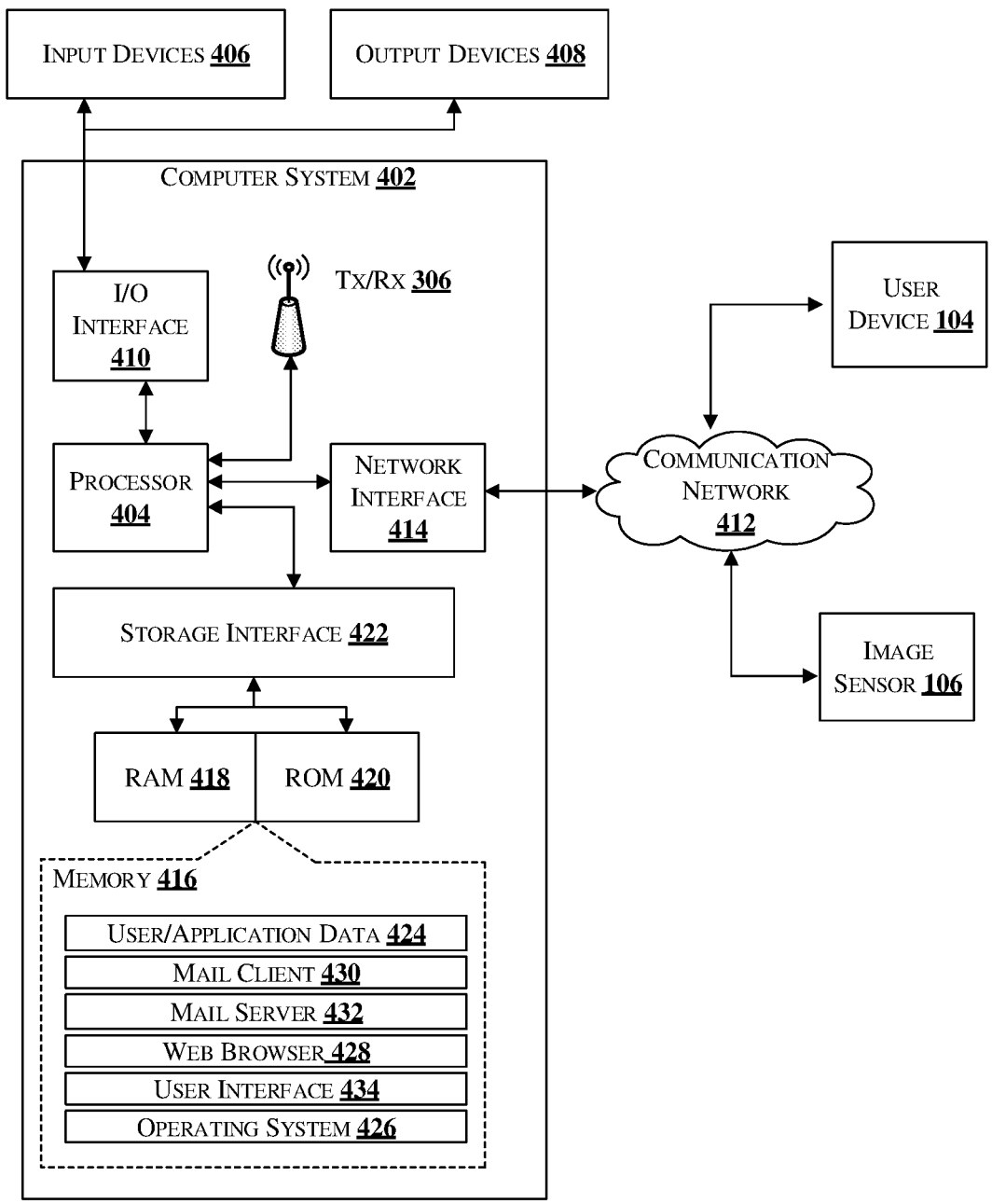
FIG. 4 illustrates a block diagram of an exemplary computer system for implementing embodiments consistent with the present disclosure.

FIG. 4 illustrates a block diagram of an exemplary computer system for implementing embodiments consistent with the present disclosure.

In an embodiment, the computer system 402 may be personalized audio space generation system 102, which is used for generating personalized audio space in the vehicle. The computer system 402 may include a central processing unit ("CPU" or "processor") 404. The processor 404 may comprise at least one data processor for executing program components for executing user or system-generated business processes. The processor 404 may include specialized processing units such as integrated system (bus) controllers, memory management control units, floating point units, graphics processing units, digital signal processing units, etc.

The processor 404 may be disposed in communication with one or more input/output (I/O) devices (406 and 408) via I/O interface 410. The I/O interface 410 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 410, the computer system 402 may communicate with one or more I/O devices (406 and 408). In some implementations, the processor 404 may be disposed in communication with a communication network 412 via a network interface 414. The network interface 414 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 414 and the communication network 412, the computer system 402 may be connected to the image sensors 106 for receiving one or more images captured by one or more image sensors 106-1, 106-2, . . . , 106-N, and may also be connected to input device 104.

The communication network 412 can be implemented as one of the several types of networks, such as intranet or any such wireless network interfaces. The communication network 412 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 412 may include a variety of network devices, including routers, bridges, servers, computing devices, storage devices, etc.

In some embodiments, the processor 404 may be disposed in communication with a memory 416 e.g., RAM 418, and ROM 420, etc. as shown in FIG. 4, via a storage interface 422. The storage interface 422 may connect to memory 416 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 416 may store a collection of program or database components, including, without limitation, user/application 424, an operating system 426, a web browser 428, a mail client 430, a mail server 432, a user interface 434, and the like. In some embodiments, computer system 402 may store user/application data 424, such as the data, variables, records, etc. as described in this invention. Such databases may be implemented as fault-tolerant, relational, scalable, secure databases such as Oracle or Sybase.

The operating system 426 may facilitate resource management and operation of the computer system 402. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™, Ubuntu™, K-Ubuntu™, etc.), International Business Machines (IBM™) OS/2™, Microsoft Windows™ (XP™, Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 402, such as cursors, icons, check boxes, menus, windows, widgets, etc. Graphical User Interfaces (GUIs) may be employed, including, without limitation, Apple™ Macintosh™ operating systems' Aqua™, IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The invention claimed is:

1. A method of assessing quality of commodities, the method comprising:
   receiving, by a processor of a quality assessment system, an input image of commodities captured by at least one image sensor coupled with the processor;
   segmenting, by the processor, the input image to generate a plurality of segmented images of the input image;
   determining, by the processor, a feature score for each of a plurality of generalized features identified based on random combination of pixels in each segmented image, wherein the plurality of generalized features is generated during training of labelled commodity images;
   computing, by the processor, a regression score of each of the plurality of segmented images based on the feature score and a predetermined weightage score corresponding to the plurality of generalized features, wherein the weightage score is dynamically determined during training of labelled commodity images;
   determining, by the processor, a likelihood score for each segmented image with respect to each of one of more predefined categories of commodities by comparing the regression score with predetermined regression score of each of the one or more predefined categories of commodities, wherein the predetermined regression score is determined during training of labelled commodity images; and
   classifying, by the processor, each of the plurality of segmented images to one of the one or more predefined categories of commodities based on the likelihood score for assessing quality of the commodities.

2. The method as claimed in claim 1, wherein segmenting the input image to generate the plurality of segmented images comprising:
   pre-processing the input image to generate a threshold image corresponding to the input image by removing background and related irregularities from the input image;
   identifying one or more pixels corresponding to corner points of the commodities in the threshold image;
   determining textural value for at least one pair of adjacent pixels of the one or more identified pixels; and
   segmenting the threshold image into the plurality of segmented images based on the textural value of pair of adjacent pixels and geometrical shape of the one or more identified pixels.

3. The method as claimed in claim 1, wherein the commodities can be selected from grains, seeds and related objects, and the one or more predefined categories of the grains include at least broken grains, shriveled grains, weevilled grains, vertical broken, damaged, slightly damaged, organic impurities, inorganic impurities, and other edible grains.

4. The method as claimed in claim 1, wherein the training of labelled commodity images comprising:
   receiving a plurality of training images of commodities of the one or more predefined categories and associated labels as input, wherein the plurality of training images is stored in an image repository coupled with the processor;
   automatically generating the plurality of generalized features from the plurality of training images of each predefined category by repeated processing of random combination of pixels in the training images;
   computing a predetermined weightage score corresponding to the plurality of generalized features of each predefined category based on weightage score successively determined for each of the plurality of training images; and
   estimating the predetermined regression score for each of the predefined categories of commodities based on the predetermined weightage score and a final feature score determined for the corresponding feature.

5. The method as claimed in claim 4, wherein automatically generating the plurality of generalized features comprising:
   deriving a plurality of features from the plurality of training images by random combination of pixels of the training images;
   determining feature score for each of the plurality of features of training images based on intensity value of randomly combined pixels;
   grouping the plurality of features having similar values of feature score to obtain the plurality of generalized features; and
   determining the final feature score based on one of the values of feature score of the plurality of features upon grouping.

6. The method as claimed in claim 4, wherein computing the predetermined weightage score corresponding to the plurality of generalized features of each predefined category, comprising:

assigning random value to weightage score for each feature of a first training image of the plurality of training images;

the computing a regression score for the first training image using the random value of weightage score and feature score, wherein feature score for the first training image is assigned with a non-zero value based on the presence of feature in the first training image;

computing the regression score for a second training image of the plurality of training images using the previously assigned random values of the weightage score;

adjusting weightage score of each feature in the second training image to match the regression score of second training image with the nearest value of computed regression score of the first training image; and determining the predetermined weightage score based on repeated adjusting of weightage score of each feature in remaining plurality of training images till the regression score matches with the value of computed regression score.

7. The method as claimed in claim 1, wherein classifying the plurality of segmented images comprising:

identifying highest value of the likelihood score for each segmented image among the likelihood scores determined with respect to predefined categories of commodities; and classifying the segmented image to one of the predefined categories associated with the highest value of the likelihood score.

8. The method as claimed in claim 1, further comprising generating a quality analysis report indicating count of predefined categories of commodities in the input image based on classification of the plurality of segmented images.

9. A quality assessment system, comprising:

a processor;

at least one image sensor coupled with the processor; and a memory communicatively coupled with the processor, wherein the memory stores processor-executable instructions, which on execution cause the processor to:

receive an input image of commodities captured by at least one image sensor coupled with the processor;

segment the input image to generate a plurality of segmented images of the input image;

determine a feature score for each of a plurality of generalized features identified based on random combination of pixels in each segmented image, wherein the plurality of generalized features is generated during training of labelled commodity images;

compute a regression score of each of the plurality of segmented images based on the feature score and a predetermined weightage score corresponding to the plurality of generalized features, wherein the weightage score is dynamically determined during training of labelled commodity images;

determine a likelihood score for each segmented image with respect to each of one of more predefined categories of commodities by comparing the regression score with predetermined regression score of each of the one or more predefined categories of commodities, wherein the predetermined regression score is determined during training of labelled commodity images; and classify each of the plurality of segmented images to one of the one or more predefined categories of commodities based on the likelihood score for assessing quality of the commodities.

10. The system as claimed in claim 9, wherein the processor is configured to segment the input image to generate the plurality of segmented images by:

pre-processing the input image to generate a threshold image corresponding to the input image by removing background and related irregularities from the input image;

identifying one or more pixels corresponding to corner points of the commodities in the threshold image;

determining textural value for at least one pair of adjacent pixels of the one or more identified pixels; and segmenting the threshold image into the plurality of segmented images based on the textural value of pair of adjacent pixels and geometrical shape of the one or more identified pixels.

11. The system as claimed in claim 9, wherein the commodities can be selected from grains, seeds and related objects, and the one or more predefined categories of the grains include at least broken grains, shriveled grains, weevilled grains, vertical broken, damaged, slightly damaged, organic impurities, inorganic impurities, and other edible grains.

12. The system as claimed in claim 9, wherein the processor is configured to train the labelled commodity images by:

receiving a plurality of training images of commodities of the one or more predefined categories and associated labels as input, wherein the plurality of training images is stored in an image repository coupled with the processor;

automatically generating the plurality of generalized features from the plurality of training images of each predefined category by repeated processing of random combination of pixels in the training images;

computing a predetermined weightage score corresponding to the plurality of generalized features of each predefined category based on weightage score successively determined for each of the plurality of training images; and estimating the predetermined regression score for each of the predefined categories of commodities based on the predetermined weightage score and a final feature score determined for the corresponding feature.

13. The system as claimed in claim 12, wherein the processor is configured to automatically generate the plurality of generalized features by:

deriving a plurality of features from the plurality of training images by random combination of pixels of the training images;

determining feature score for each of the plurality of features of training images based on intensity value of randomly combined pixels;

grouping the plurality of features having similar values of feature score to obtain the plurality of generalized features; and determining the final feature score based on one of the values of feature score of the plurality of features upon grouping.

14. The system as claimed in claim 12, wherein the processor is configured to compute the predetermined weightage score by:

assigning random value to weightage score for each feature of a first training image of the plurality of training images;

computing a regression score for the first training image using the random value of weightage score and feature score, wherein the feature score for the first training image is assigned with a non-zero value based on the presence of feature in the first training image;

computing the regression score for a second training image of the plurality of training images using the previously assigned random values of the weightage score;

adjusting weightage score of each feature in the second training image to match the regression score of second training image with the nearest value of computed regression score of the first training image; and determining the predetermined weightage score based on repeated adjusting of weightage score of each feature in remaining plurality of training images till the regression score matches with the value of computed regression score.

15. The system as claimed in claim 9, wherein the processor is configured to classify the plurality of segmented images by:

identifying highest value of the likelihood score for each segmented image among the likelihood scores determined with respect to predefined categories of commodities; and classifying the segmented image to one of the predefined categories associated with the highest value of the likelihood score.

16. The system as claimed in claim 9, wherein the processor is further configured to generate a quality analysis report indicating count of predefined categories of commodities in the input image based on classification of the plurality of segmented images.

* * * * *